(12) United States Patent
Kumagai et al.

(10) Patent No.: US 10,369,955 B2
(45) Date of Patent: Aug. 6, 2019

(54) AIRBAG DEVICE

(71) Applicant: JOYSON SAFETY SYSTEMS JAPAN K.K., Tokyo (JP)

(72) Inventors: Masayoshi Kumagai, Tokyo (JP); Kazuhiro Abe, Tokyo (JP); Masahiro Hasebe, Tokyo (JP)

(73) Assignee: JOYSON SAFETY SYSTEMS JAPAN K.K., Tokyo (JP)

( * ) Notice: Subject to any disclaimer, the term of this patent is extended or adjusted under 35 U.S.C. 154(b) by 24 days.

(21) Appl. No.: 15/542,400

(22) PCT Filed: Sep. 8, 2015

(86) PCT No.: PCT/JP2015/075400
§ 371 (c)(1),
(2) Date: Jul. 7, 2017

(87) PCT Pub. No.: WO2016/111046
PCT Pub. Date: Jul. 14, 2016

(65) Prior Publication Data
US 2017/0355347 A1 Dec. 14, 2017

(30) Foreign Application Priority Data

Jan. 8, 2015 (JP) ................................ 2015-002371

(51) Int. Cl.
*B60R 21/217* (2011.01)
*B60R 21/205* (2011.01)
(Continued)

(52) U.S. Cl.
CPC .......... *B60R 21/217* (2013.01); *B60R 21/203* (2013.01); *B60R 21/205* (2013.01); *B60R 21/274* (2013.01)

(58) Field of Classification Search
CPC ... B60R 21/203; B60R 21/205; B60R 21/217; B60R 21/274
See application file for complete search history.

(56) References Cited

U.S. PATENT DOCUMENTS 5,259,641 A * 11/1993 Schenk ................. B60R 21/217
280/731
5,320,379 A * 6/1994 Burnard ................ B60R 21/276
280/728.2
(Continued)

FOREIGN PATENT DOCUMENTS

DE 10 2011 121 220 A1 6/2013
EP 2517932 A1 10/2012
(Continued)

OTHER PUBLICATIONS

International Search Report issued in International Patent Application No. PCT/JP2015/075400 dated Nov. 17, 2015.

*Primary Examiner* — Barry Gooden, Jr.
(74) *Attorney, Agent, or Firm* — Foley & Lardner LLP

(57) ABSTRACT

Provided is an airbag device in which an inflator can be fixedly mounted easily. The airbag device includes an inflator which generates a gas; an airbag which is inflated by the gas generated by the inflator; a retainer which is provided with an insertion port into which the inflator is inserted; a bag ring which mounts the airbag in the retainer; and a spring which fixes the inflator inserted into the insertion port.

10 Claims, 20 Drawing Sheets

(51) Int. Cl.
*B60R 21/203* (2006.01)
*B60R 21/274* (2011.01)

(56) References Cited

U.S. PATENT DOCUMENTS

| | | | |
|---|---|---|---|
| 5,385,378 A | | 1/1995 | Hakamada et al. |
| 5,419,585 A | | 5/1995 | Breed et al. |
| 5,547,213 A | * | 8/1996 | Lang ................ B60R 21/217 |
| | | | 280/728.2 |
| 5,560,642 A | * | 10/1996 | Davidson ........... B60R 21/2035 |
| | | | 280/728.2 |
| 5,720,493 A | * | 2/1998 | Sugiyama ............. B60Q 5/003 |
| | | | 200/61.54 |
| 5,738,369 A | | 4/1998 | Durrani |
| 5,791,682 A | * | 8/1998 | Hiramitsu ........... B60R 21/217 |
| | | | 280/728.2 |
| 5,810,535 A | | 9/1998 | Fleckenstein et al. |
| 5,836,607 A | | 11/1998 | Wallner |
| 6,250,665 B1 | | 6/2001 | Sutherland et al. |
| 6,675,675 B1 | | 1/2004 | Sauer et al. |
| 7,478,831 B2 | | 1/2009 | Lube et al. |
| 2001/0035632 A1 | | 11/2001 | Amamori et al. |
| 2001/0050473 A1 | * | 12/2001 | Fujita .................... B60Q 5/003 |
| | | | 280/731 |
| 2002/0038946 A1 | | 4/2002 | Kobayashi et al. |
| 2003/0141706 A1 | * | 7/2003 | Lemon ................ B60R 21/276 |
| | | | 280/728.3 |
| 2003/0173759 A1 | * | 9/2003 | Grenier ............. B60R 21/2035 |
| | | | 280/728.2 |
| 2004/0169354 A1 | | 9/2004 | Kahler et al. |
| 2004/0195808 A1 | * | 10/2004 | Amamori ............. B60R 21/201 |
| | | | 280/728.2 |
| 2005/0052001 A1 | | 3/2005 | Totani et al. |
| 2012/0161424 A1 | | 6/2012 | Yamaji |
| 2013/0334800 A1 | | 12/2013 | Yamazaki et al. |
| 2015/0307050 A1 | * | 10/2015 | Smith .................... B60R 21/217 |
| | | | 280/728.2 |
| 2015/0336529 A1 | * | 11/2015 | Nebel ................ B60R 21/2037 |
| | | | 280/728.2 |
| 2016/0257278 A1 | * | 9/2016 | Fudamoto ............. B60R 21/264 |
| 2017/0355347 A1 | * | 12/2017 | Kumagai ............. B60R 21/205 |

FOREIGN PATENT DOCUMENTS

| | | |
|---|---|---|
| FR | 2 851 532 A1 | 8/2004 |
| GB | 2 330 558 A | 4/1999 |
| JP | H08-40175 A | 2/1996 |
| JP | H08-86595 A | 4/1996 |
| JP | 2001-501887 A | 2/2001 |
| JP | 2002-104123 A | 4/2002 |
| JP | 2002-249011 A | 9/2002 |
| JP | 2002-331902 A | 11/2002 |
| JP | 2003-104159 A | 4/2003 |
| JP | 3566693 B2 | 9/2004 |
| JP | 2005-075321 A | 3/2005 |
| JP | 4560881 B2 | 10/2010 |
| JP | 4658192 B2 | 3/2011 |
| JP | 2011-093446 A | 5/2011 |
| JP | 2011-121498 A | 6/2011 |
| JP | 2013-256227 A | 12/2013 |
| JP | 2014-094739 A | 5/2014 |
| JP | 5564516 B2 | 7/2014 |
| JP | 5582846 B2 | 9/2014 |
| JP | 5621543 B2 | 11/2014 |
| WO | WO-2007/091928 A1 | 8/2007 |

* cited by examiner

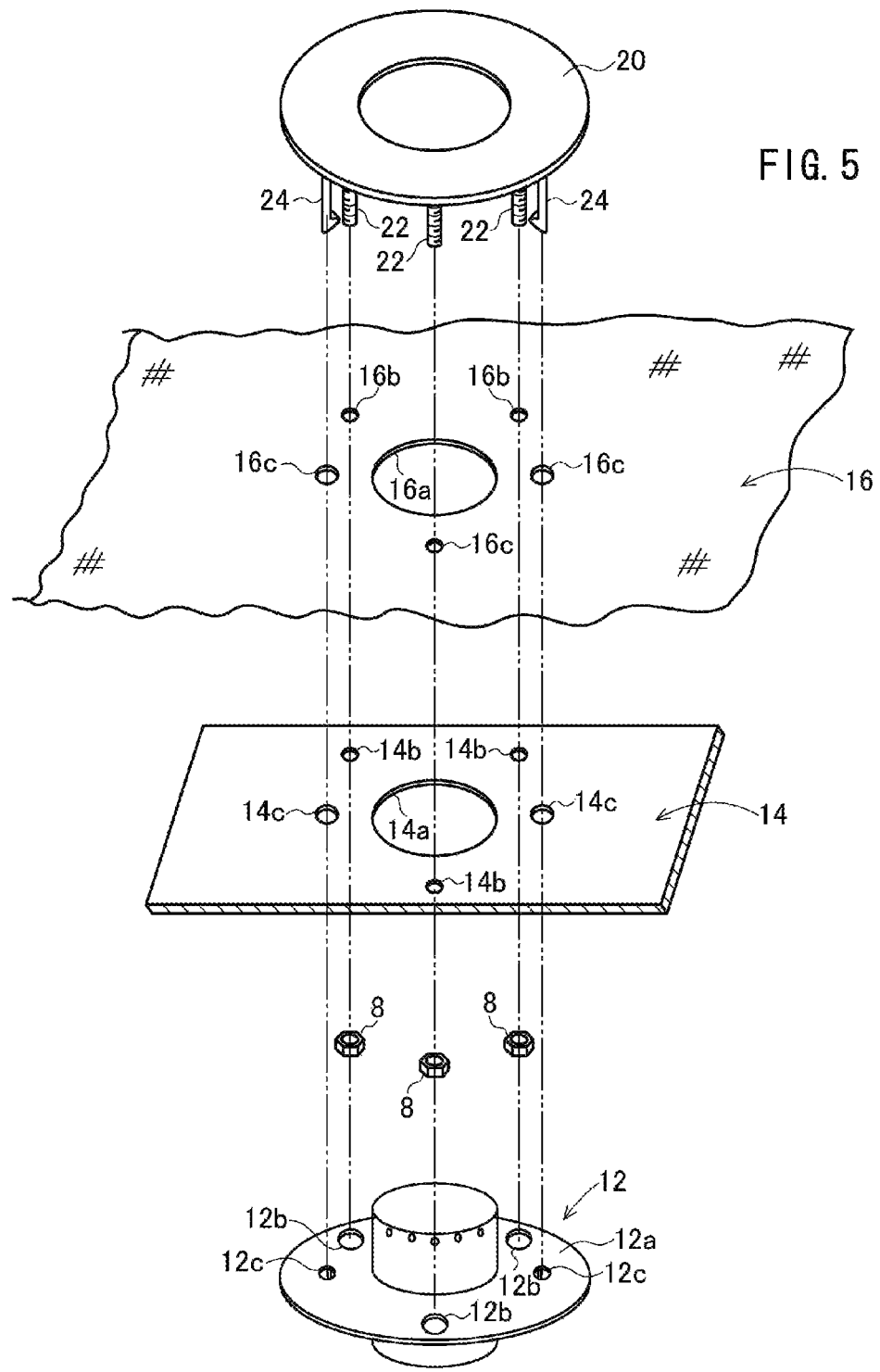

AIRBAG DEVICE

CROSS-REFERENCE TO RELATED APPLICATIONS

The present application is an U.S. national stage application of International Patent Application No. PCT/JP2015/075400, filed on Sep. 8, 2015, which claims the benefit of priority to Japanese Patent Application No. 2015-002371, filed on Jan. 8, 2015, the entire contents of which are hereby incorporated by reference, the same as if set forth at length, the entire of which are incorporated herein by reference.

TECHNICAL FIELD

The present invention relates to an airbag device which restrains a vehicle occupant at the time of collision and the like.

BACKGROUND ART

An airbag device of an automobile and the like is configured such that an inflator is operated at the time of collision and the like to generate a gas, so that an airbag is rapidly inflated by the gas and restrains an occupant. For example, the airbag device is mainly configured from an airbag, a retainer mounted with the airbag, an inflator for supplying an inflation gas to the airbag, a pressing ring for mounting the airbag in the retainer, and a module cover which covers the airbag folded at the normal time (when an emergency such as a vehicle collision does not occur) (for example, see Patent Literature 1).

An opening for mounting the inflator is provided in the vicinity of the center of the retainer. A plurality of bolt insertion holes are provided at the same interval therearound. The inflator is fitted into the inflator opening, and a flange which projects sideward from the side circumferential surface thereof abuts on the peripheral edge of the inflator opening of the retainer. The flange of the inflator is provided with bolt insertion holes which are overlapped coaxially with the bolt insertion holes of the retainer.

A peripheral edge of a gas introduction opening of the airbag is superposed in the peripheral edge of the inflator opening of the retainer, and is nipped between a pressing ring and the peripheral edge of the inflator opening of the retainer. The bolt insertion holes which are overlapped coaxially with the bolt insertion holes of the retainer are also provided around the gas introduction opening of the airbag.

A plurality of stud bolts protrude at the same interval in the pressing ring. The stud bolts penetrate respectively the bolt insertion holes which are overlapped coaxially with the airbag, the retainer, and the flange of the inflator. When the nuts are fastened into the stud bolts respectively, the pressing ring, the airbag, and the inflator are connected and fixed in the retainer.

An airbag device is known which holds an inflator without a flange for mounting and fixing (for example, see Patent Literature 2). The airbag device includes the inflator, a retainer, an airbag, and a bag ring for mounting a peripheral edge of an opening of the airbag in the retainer. The bag ring includes a cylindrical portion which supports the end surface of the inflator in an axial direction, and a flange portion which extends from the cylindrical portion in a diameter direction.

A through hole which penetrates in the axial direction is provided in the flange portion of the bag ring, the airbag, and the retainer. By fastening the bolt inserted into the through hole, the bag ring, the airbag, and the retainer are fixedly mounted integrally with each other while holding the inflator.

In the above-described conventional airbag device, it is inevitable that a process is performed which inserts the bolt into the through hole provided in the flange of the inflator or the flange portion of the bag ring, and fastens the nut therein when the inflator is fixedly mounted. The process makes an assembly operation of the airbag device complicated, which causes cost to increase.

CITATION LIST

Patent Literature

[Patent Literature 1]: JP-A-2002-331902
[Patent Literature 2]: JP-B-4560881

SUMMARY OF INVENTION

The present invention is made to solve such conventional problems, and an object thereof is to provide an airbag device in which an inflator can be fixedly mounted easily.

An airbag device of the present invention includes an inflator that generates a gas; an airbag that is inflated by the gas generated by the inflator; a retainer that is provided with an insertion port into which the inflator is inserted; a bag ring that mounts the airbag in the retainer; and a spring that fixes the inflator inserted into the insertion port.

In one aspect of the present invention, the spring is provided in the inflator, and a protrusion which stands on the bag ring and of which a tip has an L shape or a wedge shape penetrates the retainer and is engaged with the spring, so that the inflator is fixed. In this case, a bolt may stand from the bag ring. The bolt may penetrate the retainer, a nut may be threadedly attached in the bolt, and the bolt may be positioned on an outer circumferential side from the protrusion. In addition, a bolt may stand from the bag ring. The bolt may penetrate the retainer and a flange of the inflator, and a nut may be threadedly attached in the bolt, and a diameter of a bolt through hole provided in the flange may be larger than a diameter of the nut.

In another aspect of the present invention, the spring is provided in the bag ring, a protrusion which stands on a flange of the inflator and of which a tip has an L shape or a wedge shape penetrates the retainer, and is engaged with the spring, so that the inflator is fixed. In this case, the protrusion may penetrate the flange, and the protrusion may have a thick portion which pinches the flange. In addition, an engagement between the protrusion and the spring may be released when the protrusion is rotated in a circumferential direction.

In still another aspect of the present invention, the inflator is a flangeless inflator, and a concave portion is provided in a side surface, and the inflator is fixed when the spring provided on a bottom surface of the retainer enters into the concave portion. In this case, the concave portion may be a groove shape which circulates the inflator. In addition, the spring may have a U shape or a U shape with rounded corners. In addition, a portion of the retainer on an opening end side of the spring having a U shape or a U shape with rounded corners may be a detachable portion which is detachable, and the bag ring may have a C shape of which a portion corresponding to the detachable portion is open. In addition, a conduction pin may be provided in a rear surface of the inflator in an axial direction, and a transformation connector in which an extending direction of a pin is bent by 90° may be mounted in the inflator.

In still another aspect of the present invention, the airbag is a passenger seat airbag provided in a passenger seat. In this case, the inflator may be detachable from a glove box side.

An airbag device of the present invention includes a passenger seat airbag that is inflated to restrain an occupant on a passenger seat; a retainer that contains the airbag in a folded state; and an inflator that inflates the airbag. An openable opening is provided in a side surface of the retainer on a glove box side, and the inflator is detachable through the opening from the glove box side.

Advantageous Effects of the Invention

In the airbag device of the present invention, the inflator is fixed in the retainer by using the spring. For this reason, the inflator can be fixedly mounted by a simple operation that inserts and presses the inflator into the inflator insertion port of the retainer.

BRIEF DESCRIPTION OF THE DRAWINGS

FIG. 5 is an exploded perspective view of the airbag device according to the first embodiment.

DESCRIPTION OF EMBODIMENTS

Hereinafter, an embodiment will be described with reference to the drawings.

In the following embodiment, a direction in which the airbag is inflated and deployed (a direction toward an occupant) may be referred to as a front side, and the opposite direction thereto may be referred to as a rear side.

[First Embodiment]

Figure 1:
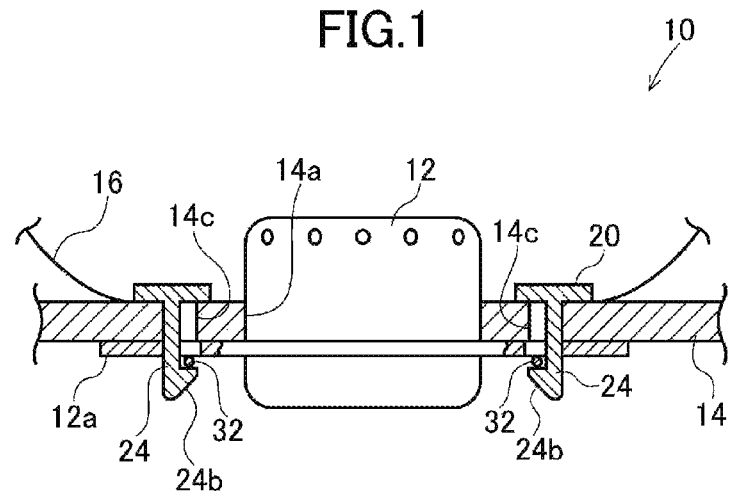
FIG. 1 is a sectional view of a mounting portion of an inflator of an airbag device according to a first embodiment.
Figure 2:
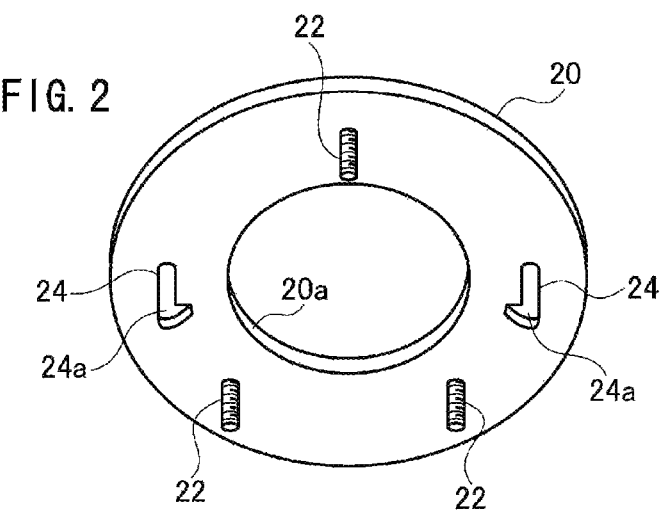
FIG. 2 is a perspective view of a bag ring of the first embodiment.
Figure 3A:
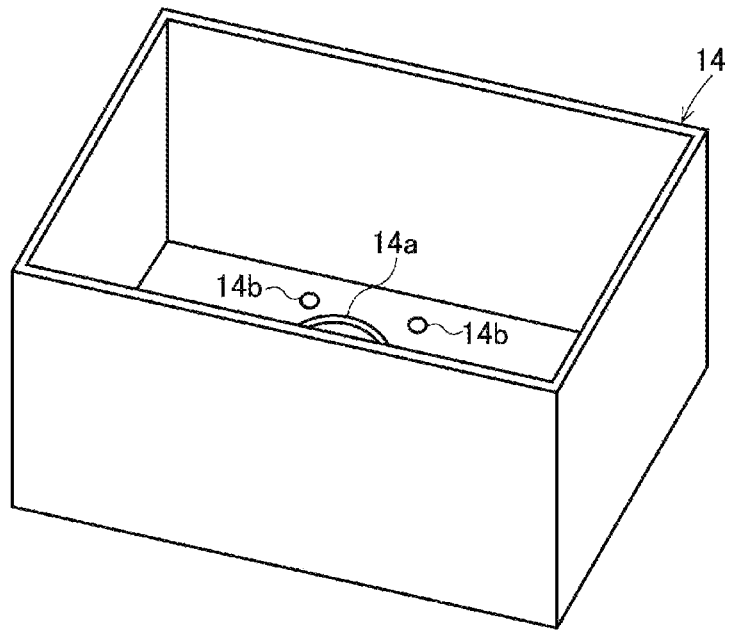
FIG. 3A is a perspective view of a retainer according to the first embodiment.
Figure 3B:
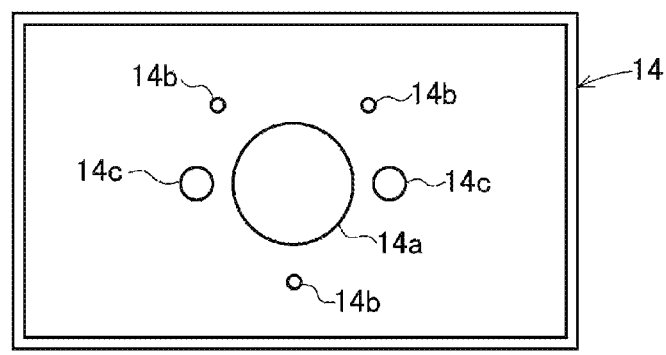
FIG. 3B is a top view.
Figure 4A:
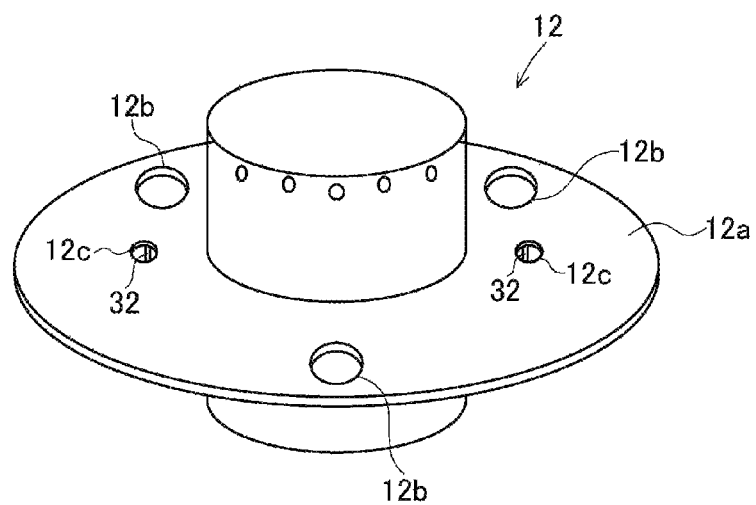
FIG. 4A is a perspective view of the inflator of the first embodiment.
Figure 4B:
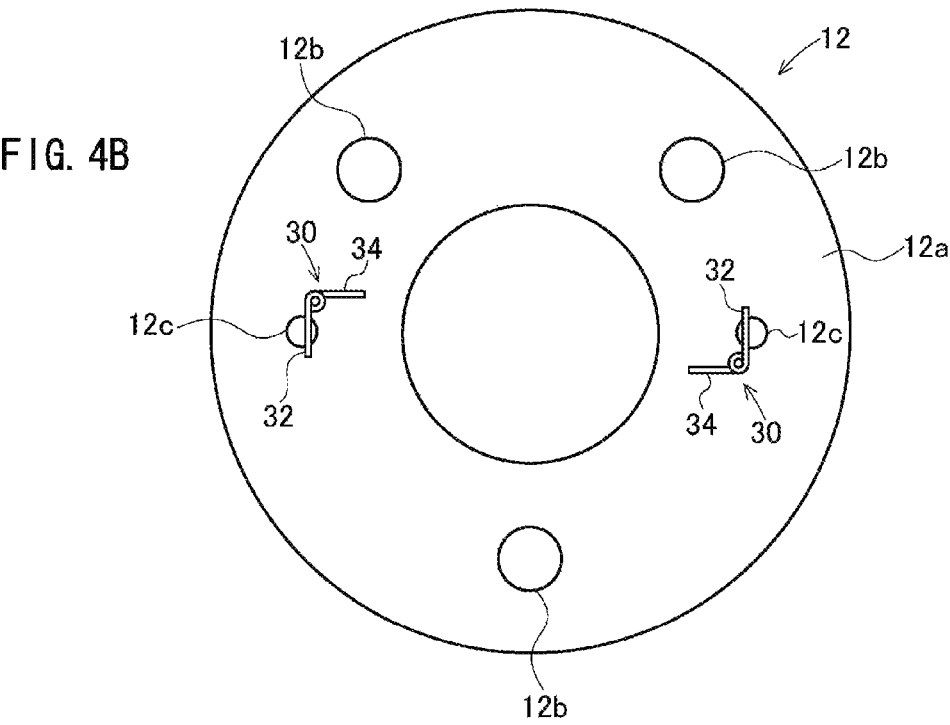
FIG. 4B is a bottom view.

FIG. 1 is a sectional view of a mounting portion of an inflator of an airbag device 10 according to a first embodiment. FIG. 2 is a perspective view of a bag ring 20 provided in the airbag device 10. FIG. 3A is a perspective view of a retainer 14 provided in the airbag device 10, and FIG. 3B is a top view of the retainer 14. FIG. 4A is a perspective view of an inflator 12 provided in the airbag device 10, and FIG. 4B is a view of the inflator 12 when seen from the rear side. FIG. 5 is an exploded perspective view of the airbag device 10. FIG. 6 is a view illustrating a mounting structure of the inflator 12.

The airbag device 10 includes the inflator 12, the retainer 14, an airbag 16, and the bag ring 20 which mounts the airbag 16 in the retainer 14. The airbag device 10 is a device which inflates and deploys the airbag 16 by using a gas generated from the inflator 12, and restrains a vehicle occupant by the inflation and deployment of the airbag 16.

As illustrated in FIG. 5, the airbag 16 includes an opening 16a for receiving a gas injection part of the inflator 12. The peripheral edge of the opening 16a is provided with a bolt insertion hole 16b into which the bolt 22 for mounting the airbag 16 in the retainer 14 is inserted, and a protrusion insertion hole 16c into which a protrusion 24 for mounting the inflator 12 is inserted.

The peripheral edge of the opening 16a of the airbag 16 is superposed with a peripheral edge of an inflator insertion port 14a of the retainer 14 (to be described later). The bag ring 20 is arranged in the airbag 16 to press the peripheral edge of the opening 16a. When the peripheral edge of the opening 16a of the airbag 16 is nipped between the bag ring 20 and the peripheral edge of the inflator insertion port 14a of the retainer 14, the airbag 16 is fixed in the retainer 14.

In this embodiment, a plurality of bolts 22 stand on the rear surface of the bag ring 20. The bolts 22 are inserted into the bolt insertion hole 16b of the airbag 16 and the bolt insertion hole 14b of the retainer 14 (to be described later), and the bag ring 20 is fixed in the retainer 14 by fastening the nut 8 in the bolt 22 from the rear surface of the retainer 14. FIG. 2 illustrates a case where three bolts 22 and two protrusions 24 stand on, but the number of members is not limited thereto.

A tip 24a of the protrusion 24 is formed in an L shape to be bent toward an opening 20a of the bag ring 20. The tip 24a is provided with a slant surface 24b (FIGS. 1 and 6) of which the raised height to the side becomes higher from the rear side to the front side. A vicinity of a corner between the occupant side of the tip 24*a* and the protrusion 24 serves as a hook in which an arm 32 of a spring 30 (to be described later) is engaged.

As illustrated in FIGS. 3A and 3B, the retainer 14 has a substantially rectangular parallelepiped shape of which the upper surface is open. The inflator insertion port 14*a* is provided in the bottom surface of the retainer 14, and the insertion hole 14*b* into which the bolt 22 is inserted, and an insertion hole 14*c* through which the protrusion 24 is inserted are provided around the inflator insertion port 14*a*. The insertion hole 14*c* has such a diameter that the tip 24*a* of the protrusion 24 can be inserted thereto.

As illustrated in FIGS. 4A and 4B, the flange 12*a* projects sideward from the side circumferential surface of the inflator 12. The insertion hole 12*b* into which the bolt 22 and the nut 8 are inserted, and the insertion hole 12*c* into which the protrusion 24 is inserted are provided in the flange 12*a*. The diameter of the insertion hole 12*b* is larger than the outer diameter of the nut 8.

The spring 30 which is engaged in the tip 24*a* of the protrusion 24 is provided in the rear surface of the flange 12*a*. For example, the spring 30 is a torsion spring having two arms 32 and 34, the arm 32 is arranged to traverse the insertion hole 12*c* in a chord direction, and the arm 34 is fixed in the rear surface of the flange 12*a* by welding and the like. The arm 32 is elastically deformable to the center of the inflator 12.

The airbag device 10 is configured by assembling the inflator 12, the retainer 14, the airbag 16, and the bag ring 20, which have the above-described structure, with each other. A method of producing the airbag device 10 will be described by using FIGS. 5 and 6A to 6C. Incidentally, in FIG. 6, the airbag 16 is not illustrated.

First, the bolt 22 and the protrusion 24 which are provided in the bag ring 20 pass through the bolt insertion hole 16*b* and the protrusion insertion hole 16*c* of the airbag 16, and next, pass through the insertion holes 14*b* and 14*c* of the retainer 14. The bag ring 20 is fixed in the retainer 14 by fastening the nut 8 in the bolt 22 from the rear surface of the retainer 14. At this time, the airbag 16 is fixed in the retainer 14 by nipping the airbag 16 between the bag ring 20 and the retainer 14.

Subsequently, the inflator 12 is inserted into the inflator insertion port 14*a* from the rear surface of the retainer 14. At this time, a position is arranged such that the bolt 22 and the nut 8 pass through the insertion hole 12*b*, and the protrusion 24 passes through the insertion hole 12*c*.

Figure 6A:
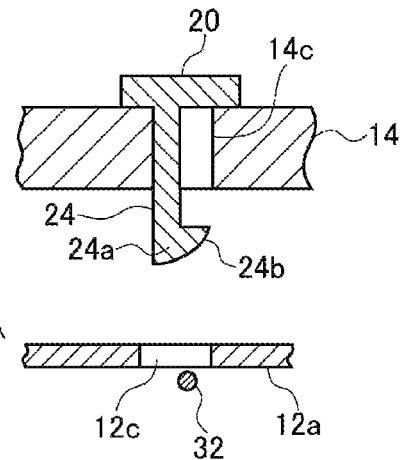
FIGS. 6A to 6C are views illustrating a mounting structure of the inflator according to the first embodiment.
Figure 6B:
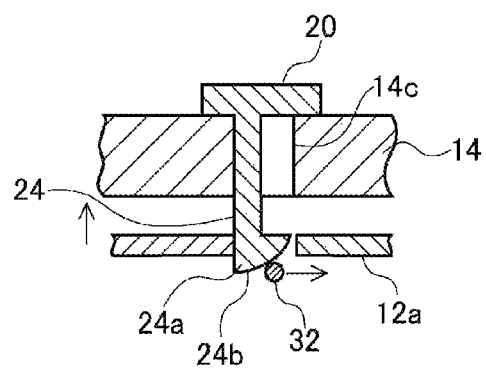
Figure 6C:
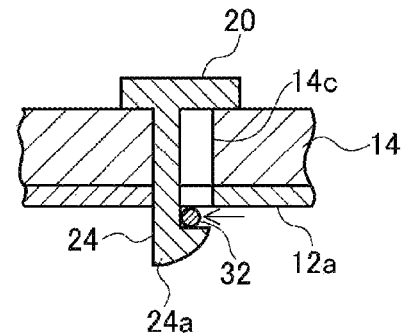

When the inflator 12 is brought close to the retainer 14 from the rear surface of the retainer 14, the protrusion 24 is inserted into the insertion hole 12*c*. As illustrated in FIGS. 6A to 6C, simultaneously, the arm 32 of the spring 30 is elastically pushed by the slant surface 24*b* of the tip 24*a* of the protrusion 24 and slides along the slant surface 24*b*. The arm 32 turns around the tip of the slant surface 24*b* and enters into the hook on the back side of the tip 24*a*. As illustrated in FIG. 6C, the inflator 12 cannot move in the vertical direction when the arm 32 is nipped between the tip 24*a* of the protrusion 24 and the rear surface of the retainer 14.

In a case where the inflator 12 fixed by the spring 30 is detached from the retainer 14, by using a tool such as a flat tip screwdriver, the arm 32 of the spring 30 may be elastically deformed to the central side of the inflator 12 such that the arm 32 is separated from the hook.

As described above, in the airbag device 10, the spring 30 is provided in the inflator 12, and the spring 30 is engaged in the hook on the back side of the tip 24*a* of the protrusion 24 standing on the bag ring 20, thereby fixing the inflator 12. For this reason, the inflator can be fixedly mounted by a simple operation that presses the inflator 12 into the retainer 14 in which the bag ring 20 is fixed. In addition, the inflator 12 can be detached by a simple operation that separates the arm 32 from the hook.

Figure 7:
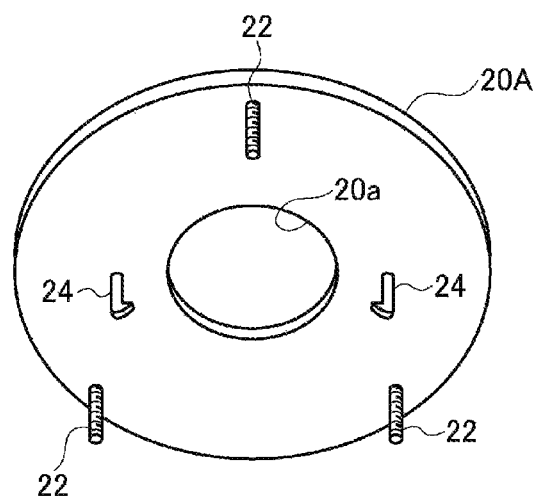
FIG. 7 is a perspective view of a bag ring of a modification.
Figure 8:
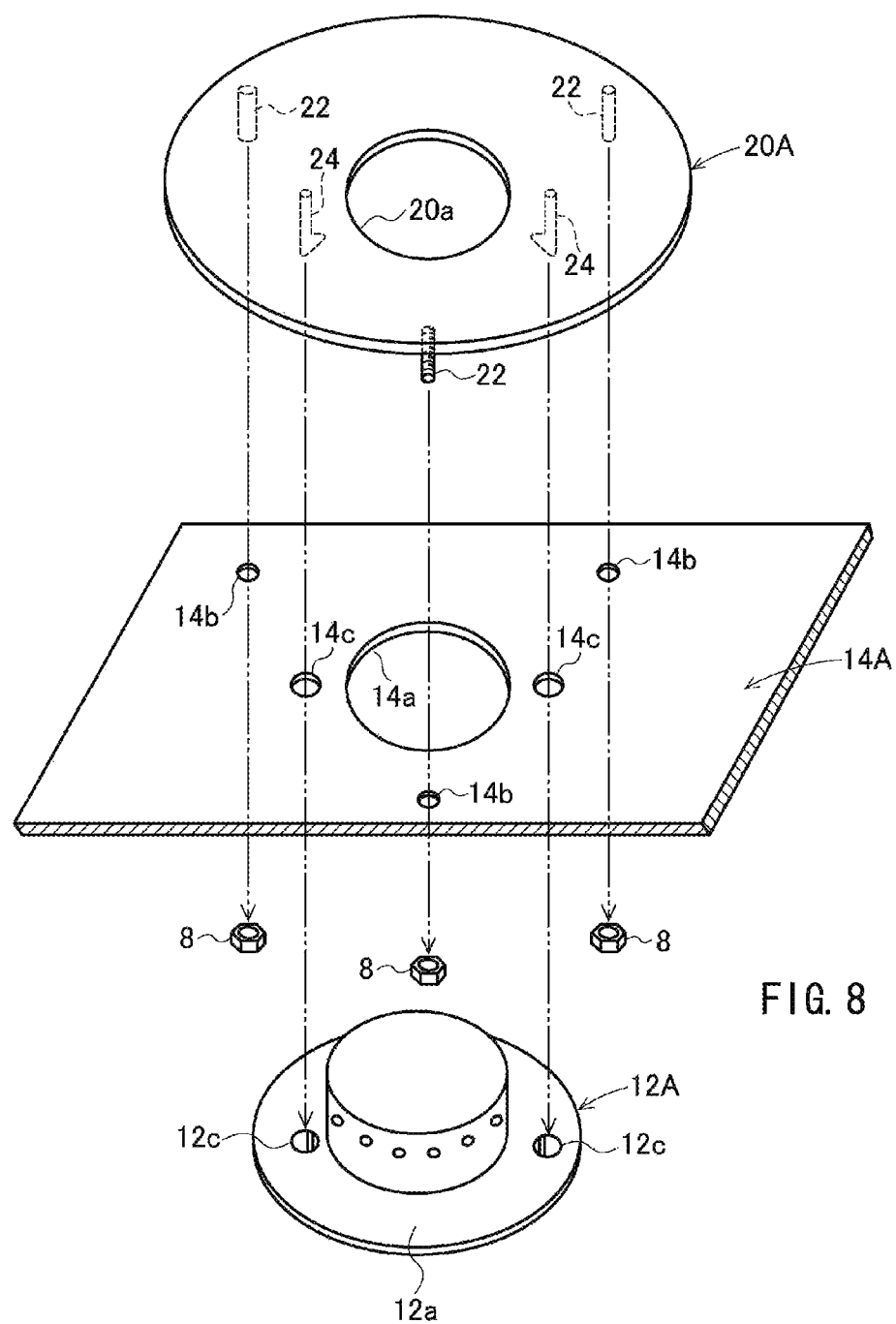
FIG. 8 is an exploded perspective view of the airbag device of the modification.

In the above-described first embodiment, as illustrated in FIG. 2, the bolt 22 and the protrusion 24 standing from the bag ring 20 are arranged in a substantially concentric shape. However, as illustrated in FIG. 7, the bolt 22 may be arranged on the outer circumferential side of the protrusion 24 when seen from the center of the bag ring 20A. When the diameter of the circumference in which the bolt 22 is arranged is larger than the diameter of the flange 12*a* of the inflator 12, the insertion hole 12*b* may not be provided in the flange 12*a* as illustrated in FIG. 8.

Figure 9:
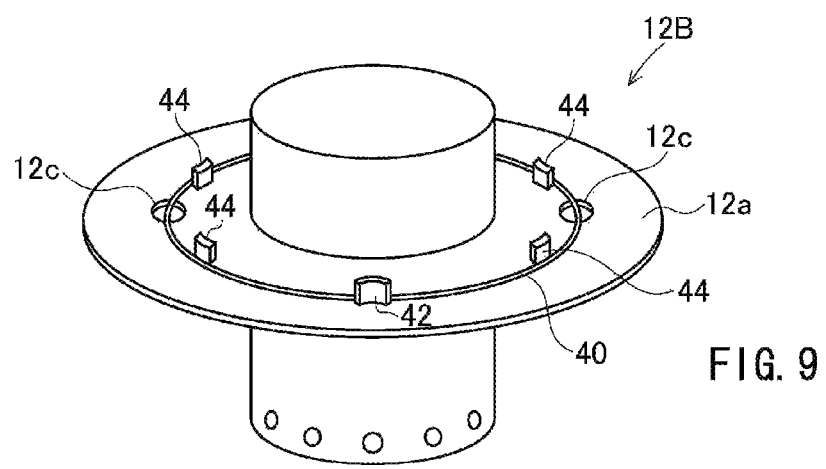
FIG. 9 is a perspective view of an inflator of the modification.

In the above-described first embodiment, it is exemplarily described that the spring 30 configured by the torsion spring which is engaged in the tip 24*a* of the protrusion 24 is provided in the rear surface side of the flange 12*a* as illustrated in FIGS. 4A and 4B. However, the spring 30 is not limited to the torsion spring. For example, the spring 40 having a circumferential shape may be used as illustrated in FIG. 9. A plurality of protrusions 42 and 44 protrude on the rear surface of the flange 12*a*. The protrusions 44 are arranged in both ends of the insertion hole 12*c*. The spring 40 is arranged along the outer circumferential surface of the protrusion 44 and the inner circumferential surface of the protrusion 42 so as to pass through the insertion hole 12*c*. In a portion of the insertion hole 12*c* between the protrusions 44, the spring 40 is also elastically deformable to the central side of the inflator 12B. FIG. 9 illustrates a state where the rear surface of the inflator 12B is set as an upper side.

A direction in which the tip 24*a* of the protrusion 24 is bent and a direction in which the springs 30 and 40 can be elastically deformed may be set conversely. The shape of the tip 24*a* is not limited to the L shape, but for example, may be a wedge shape of which the diameter is reduced in a direction to the tip.

[Second Embodiment]

Figure 10:
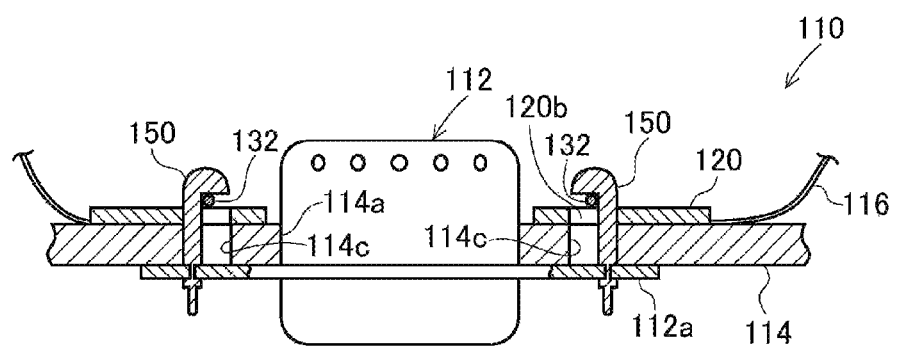
FIG. 10 is a sectional view of a mounting portion of an inflator of an airbag device of a second embodiment.
Figure 11A:
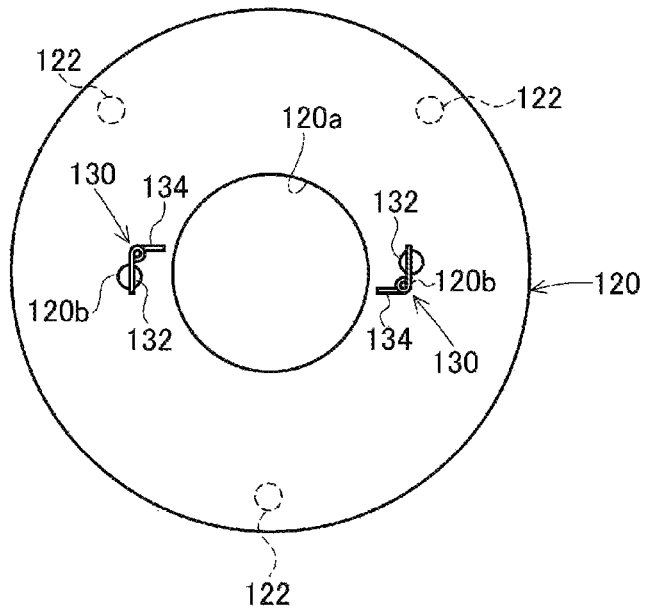
FIG. 11A is a top view of a bag ring of the second embodiment.
Figure 11B:
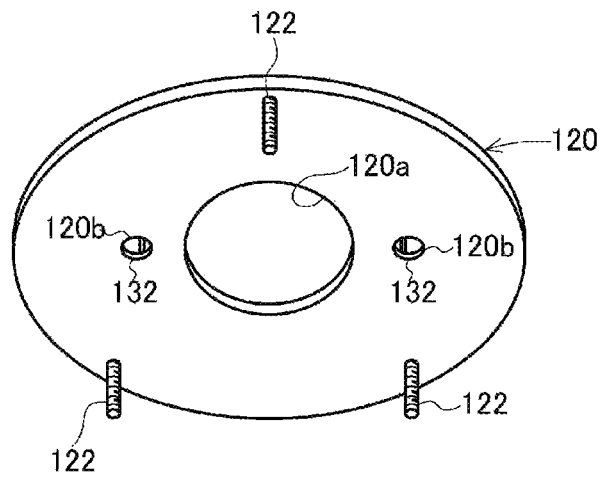
FIG. 11B is a perspective view thereof.
Figure 12A:
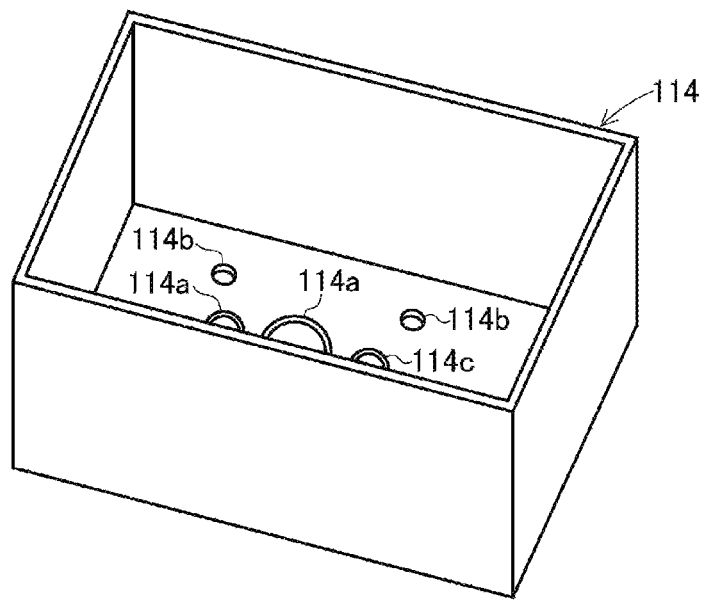
FIG. 12A is a perspective view of a retainer according to the second embodiment.
Figure 12B:
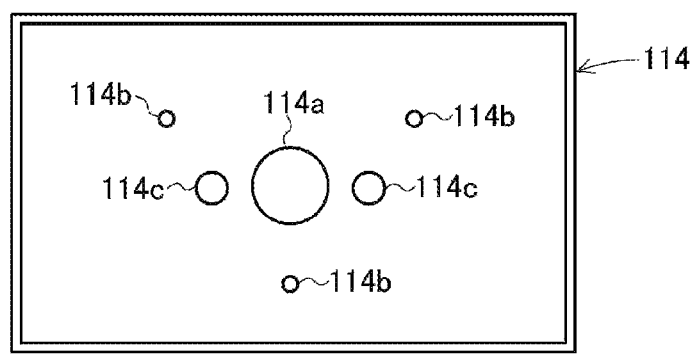
FIG. 12B is a top view.
Figure 13A:
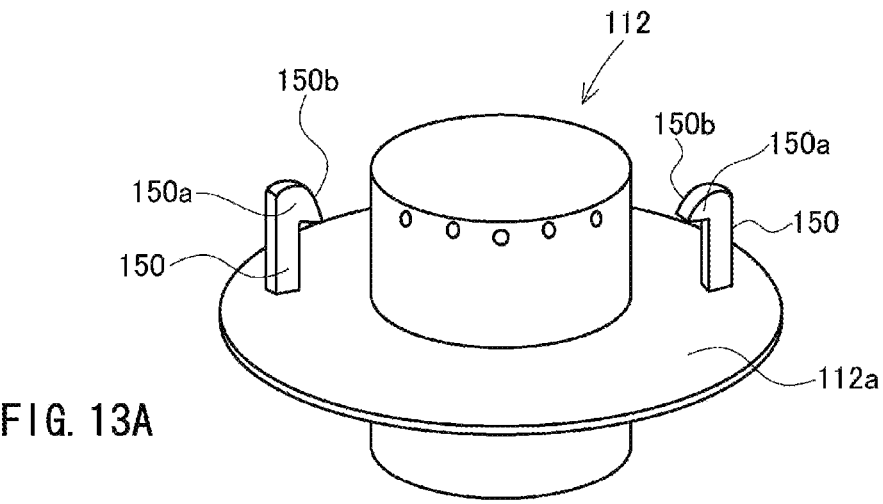
FIG. 13A is a perspective view of the inflator according to the second embodiment.
Figure 13B:
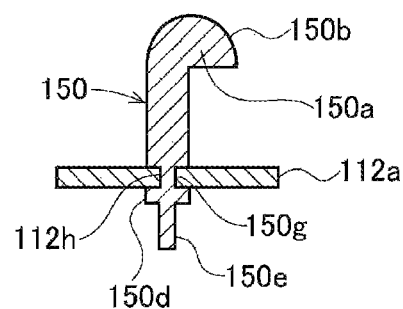
FIGS. 13B and 13C are sectional views of a main portion.
Figure 13C:
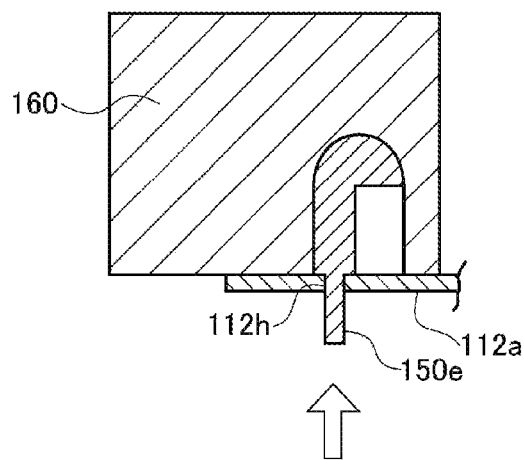
Figure 14:
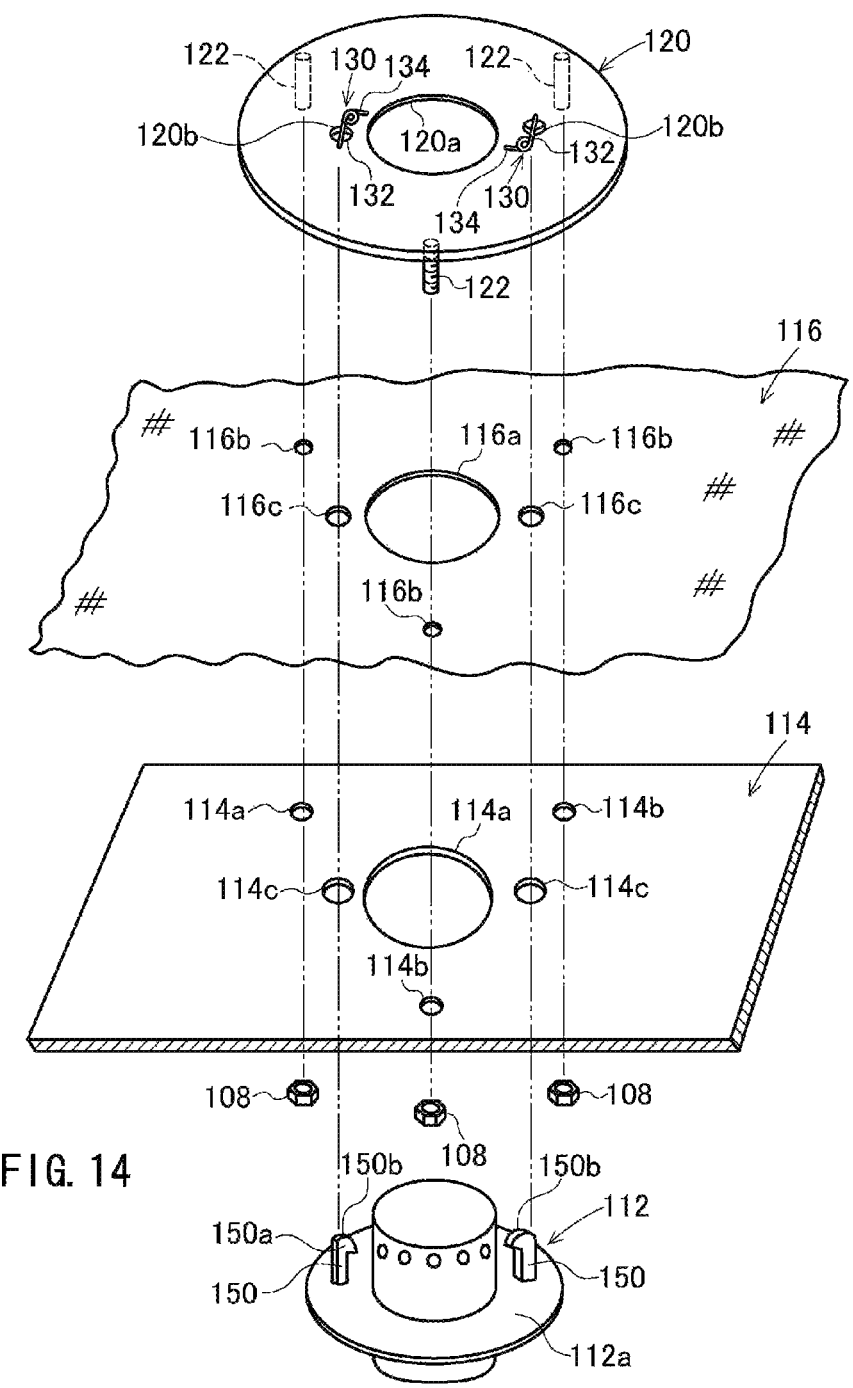
FIG. 14 is an exploded perspective view of the airbag device according to the second embodiment.
Figure 15A:
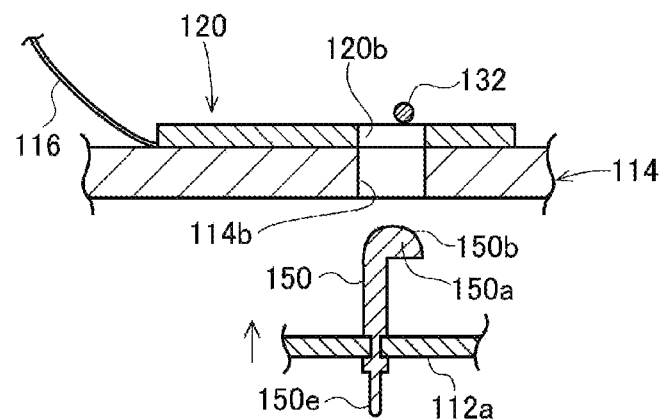
FIGS. 15A to 15C are views illustrating a mounting structure of the inflator according to the second embodiment.
Figure 15B:
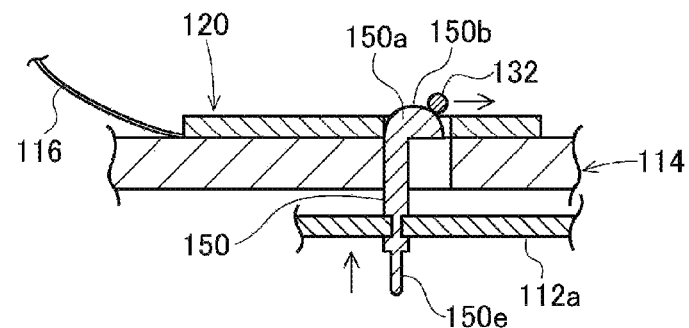
Figure 15C:
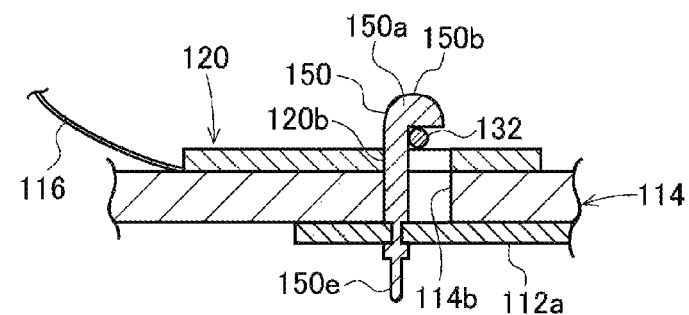
Figure 16A:
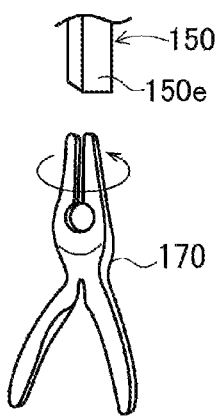
FIGS. 16A to 16C are views illustrating a method of detaching the inflator according to the second embodiment.
Figure 16B:
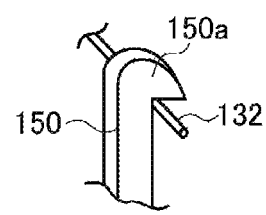
Figure 16C:
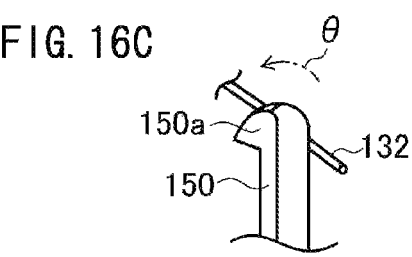

FIG. 10 is a sectional view of a mounting portion of an inflator of an airbag device 110 according to a second embodiment. FIG. 11A is a top view of a bag ring 120 provided in the airbag device 110, and FIG. 11B is a perspective view when the bag ring 120 is seen from the rear side. FIG. 12A is a perspective view of a retainer 114 provided in the airbag device 110, and FIG. 12B is a top view of the retainer 114. FIG. 13A is a perspective view of an inflator 112 provided in the airbag device 110, FIG. 13B is a sectional view of a protrusion 150 provided in the inflator 112, and FIG. 13C is a view illustrating a method of producing the protrusion 150. FIG. 14 is an exploded perspective view of the airbag device 110. FIGS. 15A to 15C are views illustrating a mounting structure of the inflator 112. FIGS. 16A to 16C are views illustrating a method of detaching the inflator 112.

The airbag device 10 according to the above-described first embodiment is configured such that the protrusion 24 stands from the bag ring 20, and the inflator 12 is fixed by engaging the spring 30 provided in the inflator 12 in the protrusion 24. In this embodiment, the protrusion 150 stands from a flange 112*a* of the inflator 112, and the inflator 112 is fixed by engaging the protrusion 150 and a spring 130 provided in the bag ring 120.

As illustrated in FIG. 14, a peripheral edge of an inflator insertion opening 116*a* of an airbag 116 is superposed with a peripheral edge of an inflator insertion port 114*a* of the retainer 114. Further, the bag ring 120 is arranged in the airbag 116 to press the peripheral edge of the opening 116a, and the peripheral edge of the opening 116a of the airbag 116 is nipped between the bag ring 120 and the peripheral edge of the inflator insertion port 114a of the retainer 114, whereby the airbag 116 is fixed in the retainer 114.

As illustrated in FIG. 14, a plurality of bolts 122 stand on the rear surface of the bag ring 120. The bolts 122 are inserted into the bolt insertion hole 116b of the airbag 116 and the bolt insertion hole 114b of the retainer 114, and the nut 108 are fastened in the bolts 122 from the rear surface of the retainer 114, whereby the bag ring 120 is fixed in the retainer 114. The insertion hole 120b into which the protrusion 150 of the inflator 112 (to be described later) is inserted is provided in the bag ring 120.

The spring 130 which is engaged in a tip 150a of the protrusion 150 is provided in the front surface of the bag ring 120. For example, the spring 130 is a torsion spring having two arms 132 and 134. However, an arm 132 is arranged to traverse the insertion hole 120b in the chord direction, and the arm 134 is fixed in the front surface of the bag ring 120 by welding and the like. The arm 132 is elastically deformable to the central side of the bag ring 120.

The bolt 122 stands on the outer circumferential side from a position where the insertion hole 120b is formed when seen from the center of the bag ring 120.

As illustrated in FIGS. 12A and 12B, the retainer 114 is a rectangular parallelepiped shape of which the upper surface is open. The inflator insertion port 114a is provided in the bottom surface of the retainer 114, and the insertion hole 114b into which the bolt 122 is inserted, and the insertion hole 114c into which the protrusion 150 is inserted are provided around the inflator insertion port 114a. The insertion hole 114c has such a diameter that the tip 150a of the protrusion 150 can be inserted thereinto.

As illustrated in FIGS. 13A and 13B, and 14, the flange 112a projects sideward from the side circumferential surface of the inflator 112. The protrusion 150 stands toward the front surface from the flange 112a.

The tip 150a of the protrusion 150 is formed in the L shape to be bent toward the central side of the inflator 112. The tip 150a is provided with a slant surface 150b of which the raised height to the side becomes higher from the front side to the rear side. A vicinity of a corner between the side, which is opposite to the occupant, of the tip 150a and the protrusion 150 serves as a hook in which the arm 132 of the spring 130 is engaged. Incidentally, the shape of the tip 150a is not limited to the L shape, and for example, may be a wedge shape of which the diameter is reduced in the direction to the tip.

The rear end 150e of the protrusion 150 penetrates a small hole 112h of the flange 112a and extends to the rear side of the flange 112a. The protrusion 150 has a circulating groove 150g which is engaged with the small hole 112h of the flange 112a, and stands on the flange 112a to be unmovable in the vertical direction.

For example, as illustrated in FIG. 13C, in order to stand the protrusion 150 on the flange 112a, a prismatic-shaped rear end 150e of the protrusion 150 is inserted from the front surface into the small hole 112h provided in the flange 112a, and is fixed in a mold 160. Further, a load is applied to the rear end 150e such that the rear end 150e is plastically deformed in a diameter increasing direction. Thus, a thick portion 150d is formed along the rear surface of the flange 112a, and the circulating groove 150g is formed.

The airbag device 110 is configured by assembling the inflator 112, the retainer 114, the airbag 116, and the bag ring 120, which have the above-described structure, with each other. A method of assembling the airbag device 110 will be described by using FIGS. 14, and 15A to 15C.

First, the bolt 122 provided in the bag ring 120 passes through the bolt insertion hole 116b of the airbag 116, and next, passes through the insertion hole 114b of the retainer 114. The bag ring 120 is fixed in the retainer 114 by fastening the nut 108 in the bolt 122 from the rear surface of the retainer 114. The airbag 116 is fixed in the retainer 114 by nipping the peripheral edge of the opening 116a of the airbag 116 between the bag ring 120 and the retainer 114.

Subsequently, the inflator 112 is inserted into the inflator insertion port 114a from the rear surface of the retainer 114. At this time, a position is arranged such that the protrusion 150 passes through the insertion hole 114c.

The inflator 112 is inserted into the inflator insertion port 114a from the rear surface of the retainer 114, and the protrusion 150 is inserted into the insertion hole 120b of the bag ring 120 through the insertion holes 114c and 116c of the retainer 114 and the airbag 116. Then, as illustrated in FIGS. 15A to 15C, the arm 132 of the spring 130 is elastically pushed by the slant surface 150b of the tip 150a of the protrusion 150 and slides along the slant surface 150b. The arm 132 turns around the tip 150a and is engaged in the hook. Accordingly, the inflator 112 is fixed in the retainer 114.

In a case where the inflator 112 fixed by the spring 130 is detached from the retainer 114, as illustrated in FIG. 16A, by using the tool 170, the rear end 150e of the protrusion 150 is nipped to be rotated by 90° in a circumferential direction (a direction of an arrow θ). Accordingly, as illustrated in FIGS. 16B and 16C, the inflator 112 can be detached from the retainer 114 when the engagement between the tip 150a of the protrusion 150 and the arm 132 of the spring 130 is released.

In the airbag device 110, as described above, the spring 130 is provided in the bag ring 120, and the spring 130 is engaged in the tip 150a of the protrusion 150 standing from the flange 112a of the inflator 112, thereby fixing the inflator 112. For this reason, the inflator 112 can be fixedly mounted by a simple operation that presses the inflator 112 into the retainer 114 in which the bag ring 120 is fixed. In addition, the inflator 112 can be detached by a simple operation that nips and rotates the rear end 150e of the protrusion 150 by using a tool.

[Third Embodiment]

Figure 17:
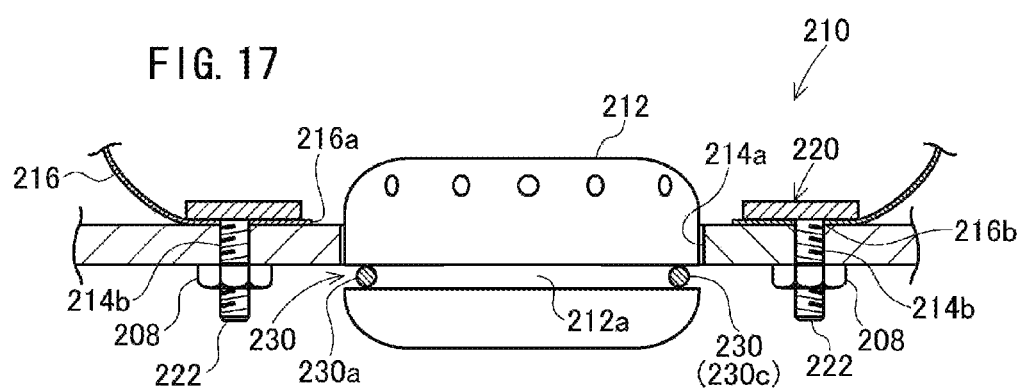
FIG. 17 is a sectional view of a mounting portion of an inflator of an airbag device of a third embodiment.
Figure 18:
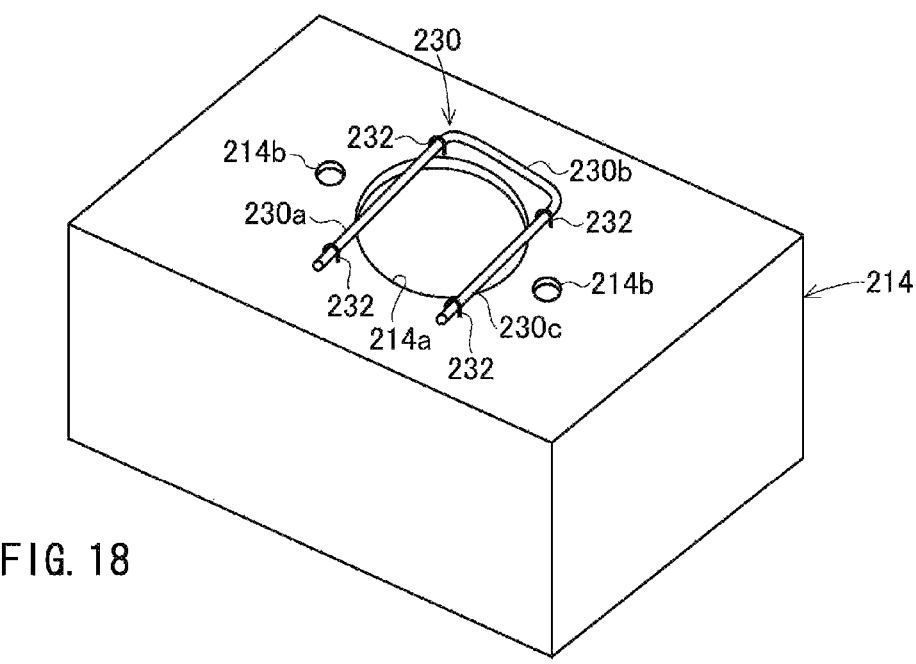
FIG. 18 is a perspective view of a retainer according to the third embodiment.
Figure 19:
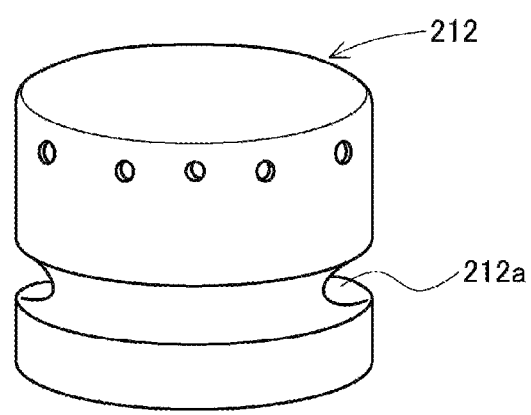
FIG. 19 is a perspective view of the inflator according to the third embodiment.
Figure 20:
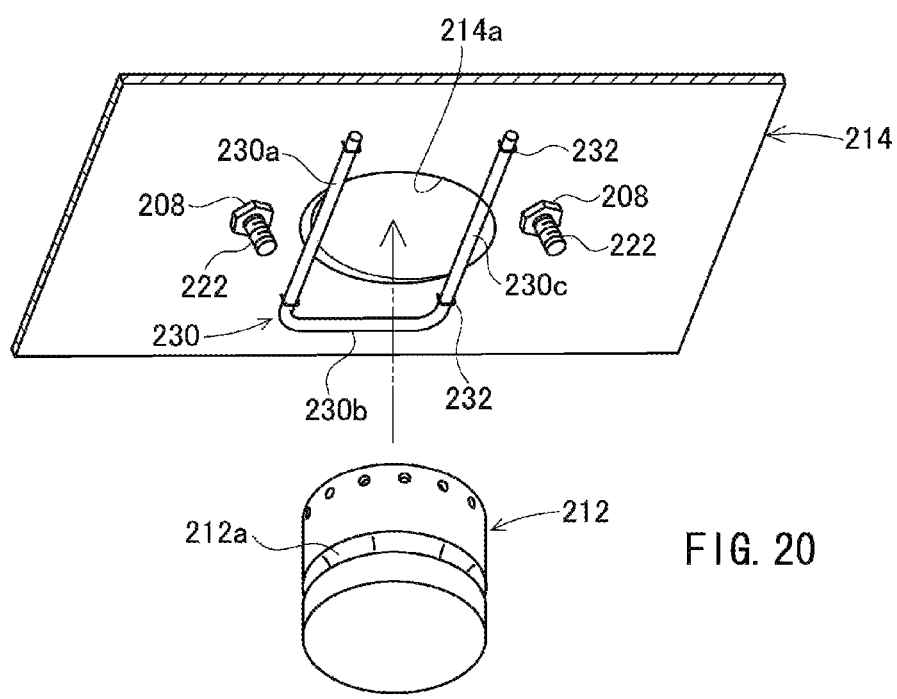
FIG. 20 is a view illustrating a method of mounting the inflator according to the third embodiment.
Figure 21A:
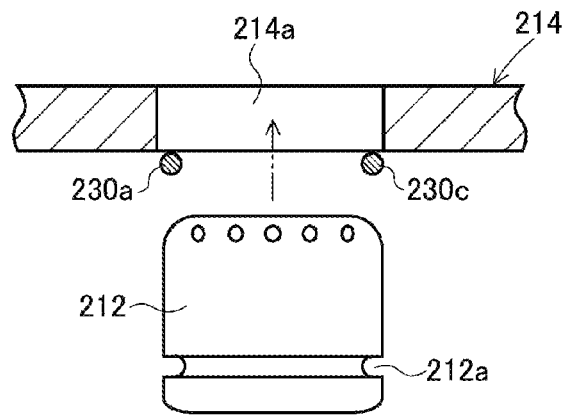
FIGS. 21A to 21C are views illustrating a mounting structure of the inflator according to the third embodiment.
Figure 21B:
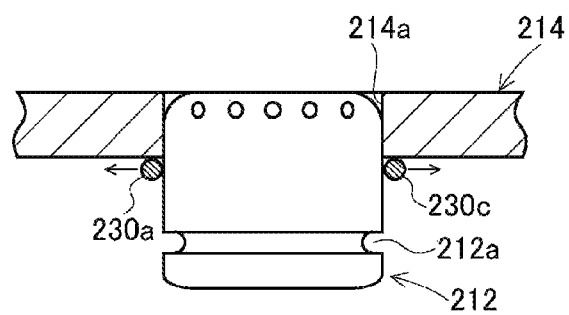
Figure 21C:
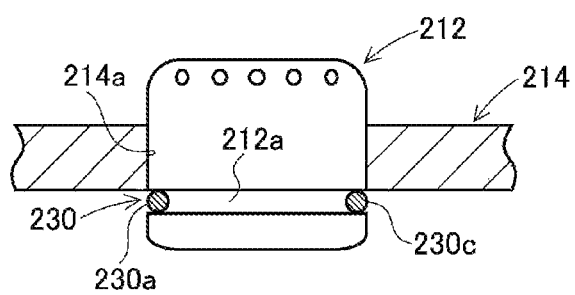

FIG. 17 is a sectional view of a mounting portion of an inflator of an airbag device 210 according to a third embodiment. FIG. 18 is a perspective view when a rear side of a retainer 214 provided in the airbag device 210 is set as an upper side. FIG. 19 is a perspective view of an inflator 212 provided in the airbag device 210. FIG. 20 is an exploded perspective view of the airbag device 210. FIGS. 21A to 21C are views illustrating a mounting structure of the inflator 212.

A peripheral edge of an inflator insertion opening 216a of an airbag 216 is superposed with a peripheral edge of an inflator insertion port 214a of the retainer 214. Further, a bag ring 220 is arranged in the airbag 216 to press the peripheral edge of the opening 216a, and the peripheral edge of the opening 216a of the airbag 216 is nipped between the bag ring 220 and the peripheral edge of the inflator insertion port 214a of the retainer 214, whereby the airbag 216 is fixed in the retainer 214. A bolt 222 stands on the rear surface of the bag ring 220. The bolt 222 is inserted into a bolt insertion hole 216b of the airbag 216 and an insertion hole 214b of the retainer 214, and a nut 208 is fastened in the bolt 222 from the rear surface of the retainer 214, whereby the bag ring 220 is fixed in the retainer 214.

The retainer 214 has a rectangular parallelepiped shape of which the upper surface is open. As illustrated in FIG. 18, the inflator insertion port 214a is provided in the bottom surface of the retainer 214, and the insertion hole 214b into which the bolt 222 is inserted is provided around the inflator insertion port 214a. A spring 230 is provided on the rear surface (back surface) of the bottom surface of the retainer 214.

The spring 230 is formed in such a U shape or a U shape with rounded corners that has a pair of parallel sides 230a and 230c, and a side 230b which connects one ends thereof with each other, and is mounted in the retainer 214 by a plurality of fixing members 232. The longitudinally central portions of the sides 230a and 230c are arranged to traverse the inflator insertion port 214a in the chord direction. The fixing members 232 are arranged in both sides, between which the insertion port 214a is interposed, of the sides 230a and 230c, respectively.

As illustrated in FIG. 19, the inflator 212 is so-called a flangeless inflator which does not have a flange and the like which protrude from a side surface in the diameter increasing direction. In the side surface of the inflator 212, a groove-shaped concave portion 212a is provided over the entire circumference, and the spring 230 enters into the concave portion 212a.

The airbag device 210 is configured by assembling the inflator 212, the retainer 214, the airbag 216, and the bag ring 220, which have the above-described structure, with each other. A method of assembling the airbag device 210 will be described by using FIGS. 20 and 21A to 21C. Incidentally, in FIGS. 20 and 21A to 21C, the airbag 216 is not illustrated.

First, the bolt 222 provided in the bag ring 220 passes through the bolt insertion hole 216b of the airbag 216, and next, passes through the insertion hole 214b of the retainer 214. The bag ring 220 is fixed in the retainer 214 by fastening the nut 208 in the bolt 222 from the rear surface of the retainer 214. The airbag 216 is fixed in the retainer 214 by nipping the peripheral edge of the opening 216a of the airbag 216 between the bag ring 220 and the retainer 214.

Subsequently, the inflator 212 is inserted into the inflator insertion port 214a from the rear surface of the retainer 214. As illustrated in FIGS. 21A to 21C, when the inflator 212 is brought close to the retainer 214 from the rear surface of the retainer 214, the sides 230a and 203c of the spring 230 are elastically pushed and slid by the side surface of the inflator 212, and enter into the concave portion 212a, whereby the inflator 212 is fixed in the retainer 214.

In a case where the inflator 212 fixed by the spring 230 is detached from the retainer 214, the sides 230a and 230c are widened, or the spring 230 is cut by using a tool.

As described above, in the airbag device 210, the spring 230 is provided in the retainer 214, and the spring 230 is engaged in the concave portion 212a provided in the side surface of the inflator 212, thereby fixing the inflator 212. For this reason, the inflator 212 can be fixedly mounted by a simple operation that inserts the inflator 212 in the retainer 214 in which the bag ring 220 is fixed. In addition, the inflator 212 can be detached by a simple operation that widens or cuts the spring 230.

In the above-described third embodiment, the spring 230 having a U shape or a U shape with rounded corners is used. However, two linear springs may be arranged in the same positions as those of the springs 230a and 230c.

In the above-described third embodiment, the inflator 212 is fixed at two points by the sides 230a and 230c of the spring 230. However, the central portion of the side 230b may be also arranged to traverse the inflator insertion port 214a in the chord direction, such that the inflator 212 is fixed at three points of the sides 230a, 230b, and 230c. In addition, a quadrangular-frame-shaped spring provided further with a fourth side which connects the tips of the sides 230a and 230c with each other may be provided to fix the inflator 212 at four points. One corner of the quadrangular-frame-shaped spring may be open while one end of the fourth side is not coupled with the tip of the side 230a or 230c.

Figure 22A:
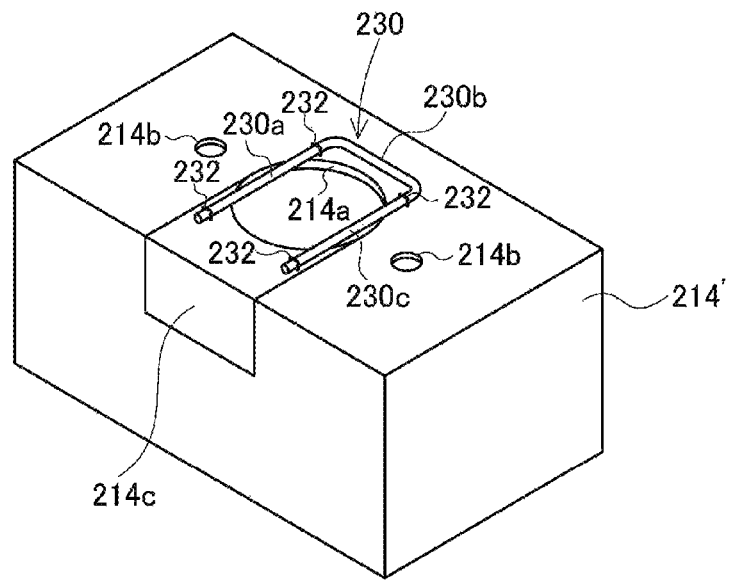
FIGS. 22A and 22B are perspective views of a retainer of the modification.
Figure 22B:
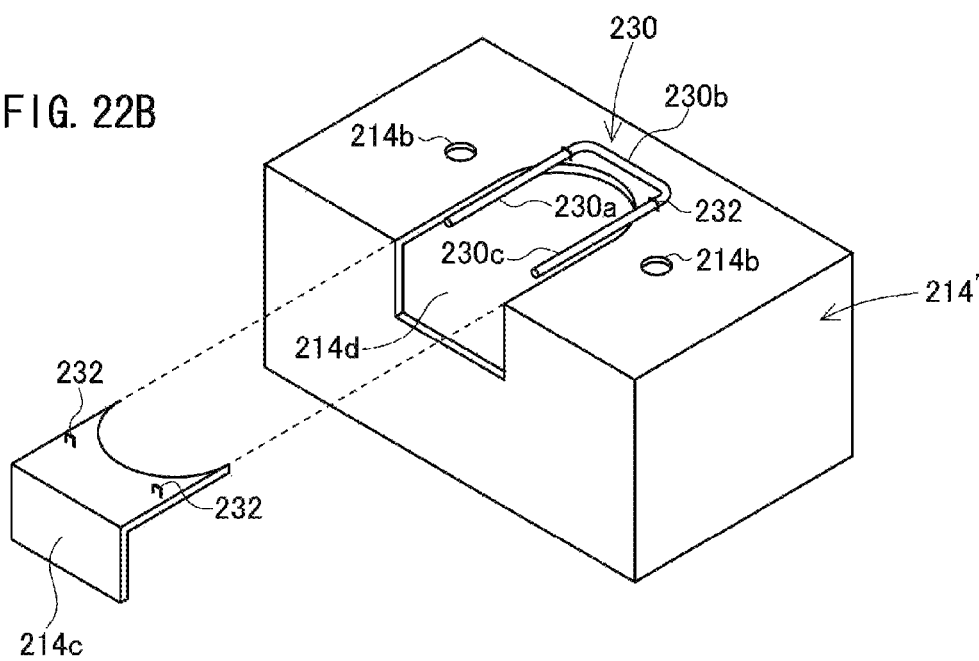

In the third embodiment, like a retainer 214' illustrated in FIGS. 22A and 22B, a portion partially configuring the inflator insertion port 214a may be configured to be detachable. In FIG. 22, a portion, which is positioned on the opening end side of the U-shaped spring 230, of the retainer 214' serves as a detachable portion 214c. In addition, the bag ring 220 has a C shape in which a portion corresponding to the detachable portion 214c is open. The inflator 212 can be slid and detached through an opening 214d formed by removing the detachable portion 214c. In this manner, when the inflator 212 can be moved in a direction along the bottom surface of the retainer 214 and be detached, the inflator 212 can be easily detached from the back surface side (vehicle side) of the steering wheel in a state where the airbag device 210 is mounted in the steering wheel.

Figure 23A:
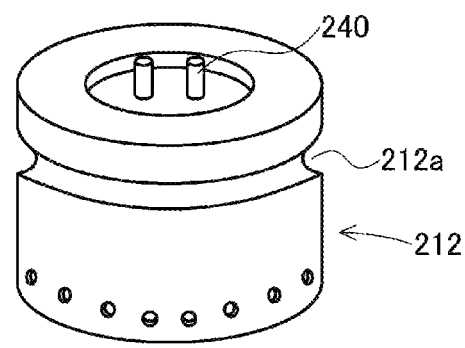
FIGS. 23A and 23B are views illustrating a transformation connector mounted in the inflator.
Figure 23B:
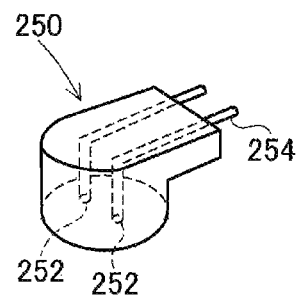

As illustrated in FIGS. 23A and 23B, in the shape of FIGS. 22A and 22B, a transformation connector 250 may be mounted in the rear surface of the inflator 212. Generally, a pin 240 for conducting current to the inflator 212 is provided in the vicinity of the center of the rear surface of the inflator 212 in an axial direction (perpendicular direction). By connecting the transformation connector 250, in which an extending direction of the pin is bent by 90° as illustrated in FIG. 23B, with the pin 240, the movement of the inflator 212 in a direction along the bottom surface of the retainer 214 illustrated in FIGS. 22A and 22B is performed easily. The transformation connector 250 has an L shape, and includes an insertion port 252 into which the pin 240 is inserted, and a pin 254 which extends sideward to form 90° with the insertion port 252.

Figure 24:
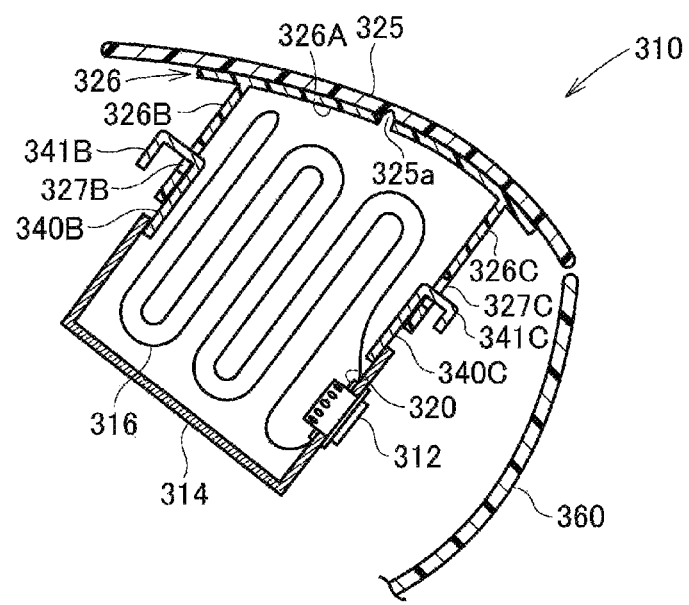
FIG. 24 is a sectional view of a passenger seat airbag device.

The airbag devices 10, 110, and 210 described in the first to third embodiments can be applied to any one of a driver seat airbag device, a passenger seat airbag device, a rear seat airbag device, and the like. FIG. 24 is a vertical sectional view illustrating an example of the passenger seat airbag device. The passenger seat airbag device 310 includes a retainer (container) 314, an airbag 316 which is arranged in the retainer 314 in a folded state and restrains a passenger occupant at the time of inflation, an inflator 312 which inflates the airbag 316, and the like.

An attachment 326 for connecting an instrument panel 325 with the retainer 314 is firmly fixed by adhesion and the like in the back surface of the instrument panel 325 which covers the opening of the retainer 314 on the upper surface side. A tear line 325a is provided in the back surface of the instrument panel 325.

The attachment 326 has a substantially π shape which has a plate-shaped portion 326A which is firmly fixed in the back surface of the instrument panel 325, and wall bodies 326B and 326C which stand from the plate-shaped portion 326A. The attachment 326 is configured by the same synthetic resin as that of the instrument panel 325. A slit is provided in the attachment 326 in a position of being overlapped with the tear line 325a. When the instrument panel 325 is cleaved along the tear line 325a, the attachment 326 is bent and deformed integrally with the instrument panel 325.

The wall body 326B is arranged on a windshield side, and has a plate shape that stands almost perpendicularly to the instrument panel 325. An opening 327B into which a hook 341B of a locking metal piece 340B is inserted is provided in the wall body 326B.

The wall body 326C is arranged on a side (occupant side) opposite to the wall body 326B with the retainer 314 interposed therebetween. An opening 327C into which a hook 341C of a locking metal piece 340C is inserted is provided in the wall body 326C.

In the locking metal pieces 340B and 340C, the lower portion thereof is firmly fixed in the retainer 314. The hooks 341B and 341C which are L-shaped hooks protrude from the upper portions of the locking metal pieces 340B and 340C.

The inflator insertion port is formed in the surface of the retainer 314 on the occupant side. The peripheral edge of the opening of the airbag 316 is superposed with the peripheral edge of the inflator insertion port of the retainer 314. Further, the bag ring 320 is arranged to press the peripheral edge of the opening along the inner circumferential surface of the airbag 316, and the peripheral edge of the opening of the airbag 316 is nipped between the bag ring 320 and the peripheral edge of the inflator insertion port of the retainer 314, whereby the airbag 316 is fixed in the retainer 314.

The structure described in the first to third embodiments is applied to the inflator 312, the retainer 314, and the bag ring 320. Accordingly, when the inflator 312 is inserted into the inflator insertion port of the retainer 314, the inflator 312 can be mounted fixedly.

When a glove box 360 is detached, the inflator 312 is exposed in a vehicle interior. By using the method described in the first to third embodiments, the inflator 312 can be easily detached from the retainer 314 from the glove box 360 side. The inflator 312 can be easily mounted again in the retainer 314.

Figure 25:
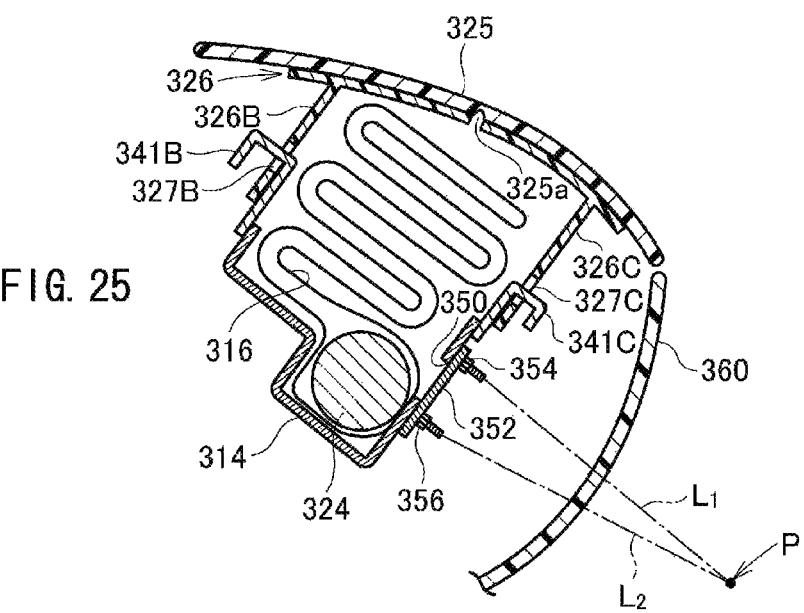
FIG. 25 is a sectional view of the passenger seat airbag device.

As illustrated in FIG. 25, the inflator of the passenger seat airbag device may be used as an inflator 324 having a substantially cylindrical shape. In this case, an opening 350 is formed in the surface of the retainer 314 on the occupant side, the opening 350 is closed by a plate-shaped portion 352, and the plate-shaped portion 352 is fixed in the retainer 314 by using mounting members 354 and 356 which are a bolt and a nut, which is preferable.

In a case where the inflator 324 is detached, first, the glove box 360 is detached, next, the mounting members 354 and 356 are removed, and the plate-shaped portion 352 is detached, whereby the opening 350 is opened. Further, the inflator 324 is extracted from the retainer 314 through the opening 350.

In this manner, by forming the opening 350 in the surface of the retainer 314 on the occupant side (the side surface on the glove box 360 side), the inflator 324 can be easily detached from the glove box 360 side.

As illustrated in FIG. 25, an intersection point P of extended lines L1 and L2 of the bolts of the mounting members 354 and 356 is preferably positioned between the glove box 360 and a cushion (not illustrated) of a seat. Accordingly, a tool for detaching the nut enters a gap between the glove box 360 and the cushion, which makes the operation easy.

An elapsed time from when the inflators 12, 112, 212, 312, and 324 are mounted may be monitored to send a notification by using a display unit and the like of the vehicle when a predetermined time is passed.

While the specific embodiments of the present invention have been described in detail above, the embodiments may be modified in various forms without departing from the scope and spirit of the present invention, which is apparent to those skilled in the art.

This application is based upon and claims the benefit of priority from the prior Japanese Patent Application No. 2015-002371 filed on Jan. 8, 2015, the entire contents of which are incorporated herein by reference.

REFERENCE SIGNS LIST 10, 110, 210: airbag device
12, 112, 212: inflator
14, 114, 214: retainer
16, 116, 216: airbag
20, 120, 220: bag ring
30, 130, 230: spring
24, 150: protrusion

The invention claimed is:

1. An airbag device comprising:
an inflator that generates a gas;
an airbag that is inflated by the gas generated by the inflator;
a retainer that is provided with an insertion port into which the inflator is inserted;
a bag ring that mounts the airbag in the retainer;
a bolt that stands from the bag ring, the bolt penetrates the retainer and a flange of the inflator, and a nut is threadedly attached on the bolt, and a diameter of a bolt through hole provided in the flange is larger than a diameter of the nut;
a spring is provided in the inflator and fixes the inflator inserted into the insertion port; and,
a protrusion which stands on the bag ring and of which a tip has an L shape or a wedge shape penetrates the retainer and is engaged with the spring, so that the inflator is fixed.

2. The airbag device according to claim 1, wherein the bolt is positioned on an outer circumferential side from the protrusion.

3. The airbag device according to claim 1 wherein the airbag is a passenger seat airbag provided in a passenger seat.

4. The airbag device according to claim 3, wherein the inflator is detachable from a glove box side.

5. An airbag device comprising:
an inflator that generates a gas;
an airbag that is inflated by the gas generated by the inflator;
a retainer that is provided with an insertion port into which the inflator is inserted;
a bag ring that mounts the airbag in the retainer; and
a spring that fixes the inflator inserted into the insertion port, the spring is provided on the bag ring, and
a protrusion which stands on a flange of the inflator and of which a tip has an L shape or a wedge shape penetrates the retainer, and is engaged with the spring, so that the inflator is fixed.

6. The airbag device according to claim 5, wherein the protrusion penetrates the flange, and
the protrusion has a thick portion which pinches the flange.

7. The airbag device according to claim 6, wherein an engagement between the protrusion and the spring is released when the protrusion is rotated in a circumferential direction.

8. An airbag device comprising:
an inflator that generates a gas;
an airbag that is inflated by the gas generated by the inflator;
a retainer that is provided with an insertion port into which the inflator is inserted;
a bag ring that mounts the airbag in the retainer;
a spring that fixes the inflator inserted into the insertion port;
wherein the inflator is a flangeless inflator, and a concave portion is provided in a side surface;
wherein the inflator is fixed when the spring provided on a bottom surface of the retainer enters into the concave portion;
wherein the spring has a U shape or a U shape with rounded corners;
wherein a portion of the retainer on an opening end side of the spring having the U shape or the U shape with rounded corners is a detachable portion which is detachable; and,
wherein the bag ring has a C shape of which a portion corresponding to the detachable portion is open.

9. The airbag device according to claim 8, wherein the concave portion is a groove shape which circulates the inflator.

10. The airbag device according to claim 8, wherein a conduction pin is provided in a rear surface of the inflator in an axial direction, and a transformation connector in which an extending direction of a pin is bent by 90° is mounted in the inflator.

* * * * *